(Model.)

T. COOK & O. ALBRECHT.
ICE MAKING APPARATUS.

No. 261,810. Patented July 25, 1882.

Witnesses.
A. Ruppert,
D. R. Cowl

Inventors
Thomas Cook
Otto Albrecht
by their attorney

UNITED STATES PATENT OFFICE.

THOMAS COOK AND OTTO ALBRECHT, OF PHILADELPHIA, PENNSYLVANIA.

ICE-MAKING APPARATUS.

SPECIFICATION forming part of Letters Patent No. 261,810, dated July 25, 1882.

Application filed February 6, 1880. Renewed January 3, 1882. (Model.)

*To all whom it may concern:*

Be it known that we, THOMAS COOK and OTTO ALBRECHT, citizens of the United States, residing at Philadelphia, in the county of Philadelphia and State of Pennsylvania, have invented certain new and useful Improvements in Ice-Making Apparatus; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the freezing apparatus of ice-making apparatus, and more especially to that class of freezing apparatuses which freeze by direct contact, though some parts of the invention are applicable to freezing apparatuses which use a non-congealable liquid as a freezing medium.

Our improvement consists of certain combinations set forth in the claims at the close of this specification, and made up out of mechanical devices of which the following are the principal: a pair of water-tanks; at least two freezing-coils, one in each water-tank, and so connected together that they will form a continuous channel for the refrigerant; means for controlling the supply and reversing the flow of the refrigerant, which means may consist of an induction-pipe for each freezing-coil and an exhaust-pipe common to the freezing-coils, including necessary cocks or valves; a traversing saw (one or more) for cutting the ice from the freezing-coils.

In order that the invention may be fully understood, we have illustrated in the annexed drawings and will proceed to describe the best form of the invention now known to us. It should be understood, however, that the construction of the apparatus may be modified in many particulars (and some modifications will be described hereinafter) to suit the views of manufacturers or users without departing from the principle of our invention.

Figure 1:
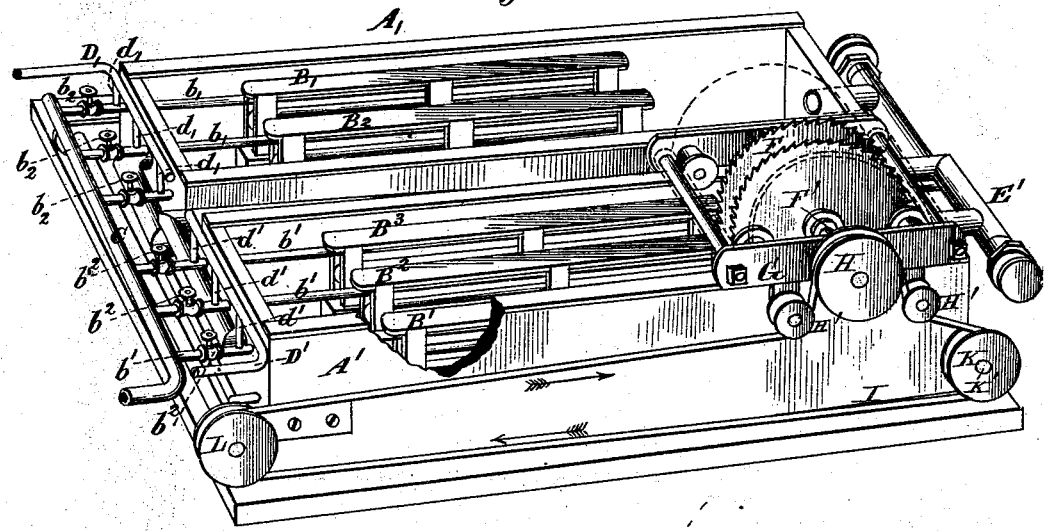
Figure 2:
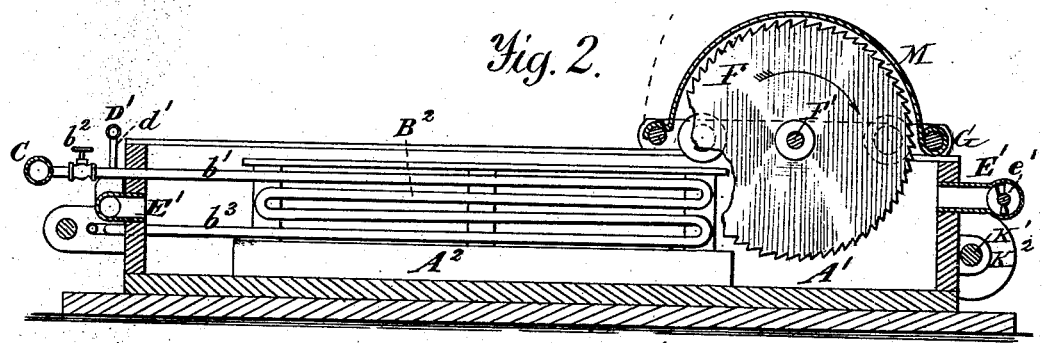
Figure 3:
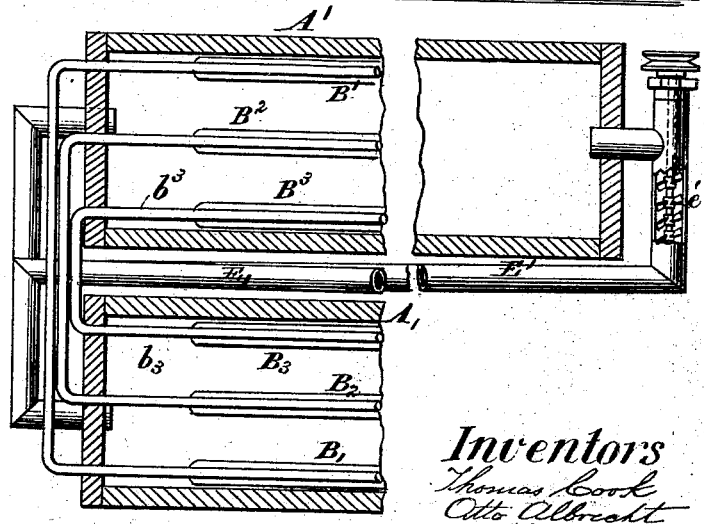

Figure 1 is a perspective view of our improved ice-making apparatus, lacking, however, the traversing saw of one of the freezers. Fig. 2 is a longitudinal vertical section thereof through one of the freezers. Fig. 3 is a sectional bottom view of the apparatus.

The same letters of reference are used in all the figures in the designation of identical parts.

In the apparatus shown two freezers are employed. One of the freezers will be described in detail by the aid of reference-letters having indices at the top, and the corresponding parts of the other freezer will be marked on the drawings with the same reference-letters, except that their indices are placed at the bottom, so that the description of one freezer will answer for both, while a distinction is preserved between their respective reference-letters to facilitate the description of the entire apparatus.

The tank $A'$ of the freezer may be constructed of wood or of any other suitable or preferred material. It is of rectangular form, and contains in this instance three freezing-coils, $B'$ $B^2$ $B^3$, of which coil $B^2$ occupies the center of the tank, while the coils $B'$ and $B^3$ are set close against the respective sides of the tank. The freezing-coils are made of pipes or tubes of such metal as is adapted to the particular refrigerant to be employed. We prefer to use anhydrous ammonia as the refrigerating agent, and for that reason construct the freezing-coils of iron pipes. The upper pipe, $b'$, of each freezing-coil is at one end extended to pass through the end of the tank and join the cross-pipe C, which conducts the spent or utilized ammoniacal gas on its way back to the compressing pump or pumps. Each of the pipes $b'$ is provided with a cock or valve, $b^2$, by means of which communication between said pipes $b'$ and the pipe C, which may be termed the "exhaust-pipe," can be opened and closed at pleasure. The lower pipe, $b^3$, of freezing-coil $B'$ is connected with the corresponding pipe, $b_3$, of freezing-coil B of the adjacent freezer. In like manner the lower pipes of the freezing-coils $B^2$ and $B^3$ are connected with the corresponding pipes of the freezing-coils $B_2$ and $B_3$ of the adjacent freezer. An induction-pipe, $D'$, through branches $d'$, is adapted to supply anhydrous liquefied ammonia to the pipes $b'$ of the freezing-coils $B'$ $B^2$ $B^3$. This induction-pipe is provided with a cock or valve, (not shown in the drawings,) so that the supply of liquefied ammonia may be turned on and cut off at pleasure. The refrigerant is supplied through either the one or the other of the induction-pipes $D'$ $D'$. When supplied by the induction-pipe $D'$ the valves $b^2$ must be shut and the valves $b_2$ opened, so that the refrigerant may flow first through the coils B' B² B³, thence through the coils B, B₂ B₃, to the exhaust-pipe C. When supplied by the induction-pipe D' the valves $b_2$ must be shut and the valves $b^2$ opened, so that the flow of the refrigerant will be in a reverse direction. The tanks will be filled with water to a height sufficient to wholly immerse the freezing-coils.

To speed the freezing and insure the production of solid and transparent ice, it is important to maintain a circulation of water through the tank. To this end the tank A' is provided with a water-pipe, E', the opposite ends of which open into the respective ends of the tank. In the illustrated arrangement this water-circulating pipe extends along one side and outside of the tank, and has elbows connected by branches to the respective ends of the tanks. One of the branches or elbows of pipe E' forms the barrel of a propeller-pump, the blades e' of which are connected to or formed on a shaft which extends through a stuffing-box of the pipe and carries a sheave or pulley by which it may be rotated. By running this propeller-pump a constant circulation of water can be maintained through the tank. Any suitable pump may be used instead of this propeller-pump to maintain a circulation of water through the tank.

The freezing-coils are suitably strapped and supported upon sills A², secured to the bottom of the tank. The tank extends a considerable distance beyond one end of the freezing-coils, forming a chamber for the accommodation of the saw or saws used for cutting the ice from the freezing-coils, as will be presently described. The distance between the freezing-coils will be just a little in excess of the thickness of the blocks of ice to be formed, in order to allow for inequalities in the surfaces of the coils and for the ice cut away by the saw or saws.

The apparatus so far described is operated in the following manner: One of the tanks—say A'—is filled with water, while the other one remains empty for the time being. After opening cocks $b_2$ and closing cocks $b^2$ the refrigerant is admitted through the induction D', and flows first through the coils of the empty tank A', where, by taking up heat from the air, it will be considerably tempered, so that its freezing action through the coils of the filled tank A' will be of a nature mild enough to produce a transparent ice from the beginning of the operation. The freezing is continued in this manner until the coils in tank A have become coated with ice of considerable thickness. The supply of the refrigerant through induction-pipe D' is then cut off, the valves $b_2$ closed, valves $b^2$ opened, and the refrigerant admitted through induction-pipe D', the tank A' having in the meanwhile been filled with water. The severest freezing now occurs in tank A', where the coils are already covered with a thick coat of ice, while a mild freezing takes place in tank A', as required, in order to make transparent ice on its coils from the commencement of freezing. Both propeller-pumps are kept running to maintain an active circulation of water through the tanks while the freezing continues. As soon as the ice in tank A' has frozen solid from coil to coil the flow of the refrigerant is again reversed, so that the severest freezing will take place in the tank A'. The ice is then immediately cut from the coils in tank A', which is to this end provided with a saw or saws, in the same way as tank A', in connection with which such a sawing apparatus is shown. The cutting off from all the coils in the tank may be accomplished at a single operation by the use of a gang of saws; or a single saw only may be used to make successive cuts through the ice along the faces of the coils. In the present instance we have shown a pair of circular saws, F, mounted on a single arbor, F', and so spaced that they will run between two adjacent coils to cut off the slab of ice frozen between such coils. The saw-arbor turns in bearings on a carriage, G, which straddles the tank, and has small truck-wheels to run upon rails on the top edge of the sides of the tank. The saw-arbor carries a pulley, H, which is driven by means of a belt, I, from a driving-pulley, K, on the counter-shaft K', which carries a pulley, K², to be driven from the line-shaft. The belt I passes from the driving-pulley K to the other end of the tank around an idler, L. It is guided by guide-rollers H', which may also serve as tighteners, so as to act on about one-half of the periphery of pulley H on the saw-arbor. The guide-rollers H' are mounted on the saw-carriage G. As the axis of the saws is above the ice to be cut the saws have to be rotated so as to cut from the bottom up; and under the particular arrangement of the parts shown it will be necessary to employ feed-gearing of any suitable known description to feed the saw-carriage forward as the sawing proceeds. However, under a slightly different arrangement of the driving-gear the driving-belt I may run under instead of over the pulley H of the saw-arbor, in which case the driving-belt would have to travel in a direction reverse from that indicated by the arrows on the drawings, and consequently would have a tendency to feed the saw-carriage by drawing it forward as fast as the cutting proceeded. With the parts so modified, separate feed-gearing might be dispensed with.

The saws are traversed along the tank to cut the ice from between two coils. They are then run back to their chamber, where they are to be shifted laterally on their arbor to put them in position for cutting between the next coils. The saws, if used in pairs, as described, should be secured to a sleeve common to both, so that they can be shifted simultaneously. Having been sawed off the coils, the blocks of ice are removed from tank A', and the tank is immediately refilled with water. The flow of the refrigerant continues from the coils in tank A' to the coils in tank A' until ice has frozen solid from coil to coil in said tank A', when the flow of the refrigerant is reversed. The ice is then sawed from the coils in tank A', which is refilled with water after the removal of the ice. Thus the operation continues uninterruptedly, ice being harvested from the tanks alternately.

In practice the tanks will be made considerably wider, so as to receive an increased number of freezing-coils. The outside freezing-coils need not be set close against the sides of the tank, as shown in the drawings, and hereinbefore described. On the contrary, there may be left as much space between these outside freezing-coils and the sides of the tank as there is between two adjacent freezing-coils, so that ice may be formed on both sides of the outside freezing-coils, the same as on the intermediate coils.

We have stated that each freezer is provided with its own sawing apparatus. Instead of that, a single sawing apparatus may answer for both freezers, being used alternately in the one and the other.

While not in use the sawing apparatus may be detached from the machine.

Since hoisting machinery is required for lifting the slabs of ice out of the tanks, this same hoisting machinery can be made use of in removing and placing the sawing apparatus.

A hood, M, is arranged over the saws to direct the cuttings back into the tank.

What we claim as our invention, and desire to secure by Letters Patent, is—

1. The combination, substantially as before set forth, of two water-tanks, two connected freezing-coils, one in each tank, and forming a continuous channel for the refrigerant, and means for controlling and reversing the flow of the refrigerant through said freezing-coils.

2. The combination, substantially as before set forth, of two water-tanks, two connected freezing-coils, one in each tank, and forming a continuous channel for the refrigerant, a separate induction-pipe for each freezing-coil, and an exhaust-pipe common to both freezing-coils.

3. The combination, substantially as before set forth, of a water-tank, a fixed freezing-coil therein, and a traversing-saw.

In testimony whereof we affix our signatures in presence of two witnesses.

THOS. COOK.
OTTO ALBRECHT.

Witnesses:
LOUIS M. SIMPSON,
A. M. ZANE.